(12) United States Patent
Inoue et al.

(10) Patent No.: US 10,442,918 B2
(45) Date of Patent: Oct. 15, 2019

(54) NITRILE GROUP-CONTAINING HIGHLY SATURATED COPOLYMER RUBBER COMPOSITION AND CROSS-LINKED RUBBER

(71) Applicant: ZEON CORPORATION, Tokyo (JP)

(72) Inventors: Sayaka Inoue, Tokyo (JP); Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/038,547

(22) PCT Filed: Nov. 26, 2014

(86) PCT No.: PCT/JP2014/081183
§ 371 (c)(1),
(2) Date: May 23, 2016

(87) PCT Pub. No.: WO2015/080130
PCT Pub. Date: Jun. 4, 2015

(65) Prior Publication Data
US 2016/0297955 A1    Oct. 13, 2016

(30) Foreign Application Priority Data

Nov. 28, 2013 (JP) ................................. 2013-245735

(51) Int. Cl.
*C08L 13/00* (2006.01)
*C08L 15/00* (2006.01)

(52) U.S. Cl.
CPC .............. *C08L 13/00* (2013.01); *C08L 15/00* (2013.01)

(58) Field of Classification Search
CPC ..................................................... C08L 13/00
USPC .................................................. 524/493, 308
See application file for complete search history.

(56) References Cited

U.S. PATENT DOCUMENTS

| | | | |
|---|---|---|---|
| 2003/0096071 A1 | 5/2003 | Takashima et al. | |
| 2005/0085593 A1 | 4/2005 | Tsukada et al. | |
| 2009/0234054 A1* | 9/2009 | Nagamori | C08K 5/098 524/263 |
| 2011/0315486 A1* | 12/2011 | Komurasaki | C08J 3/24 184/88.1 |
| 2012/0041127 A1 | 2/2012 | Nagamori et al. | |
| 2013/0280459 A1* | 10/2013 | Nakashima | C08L 13/00 428/36.8 |
| 2015/0166811 A1 | 6/2015 | Aoyagi et al. | |
| 2015/0175774 A1* | 6/2015 | Aoyagi | C08K 3/36 524/308 |
| 2015/0175784 A1 | 6/2015 | Aoyagi et al. | |

FOREIGN PATENT DOCUMENTS

| | | |
|---|---|---|
| EP | 1 449 873 A1 | 8/2004 |
| EP | 2 033 990 B1 | 6/2013 |
| JP | S63-95242 A | 4/1988 |
| JP | 07-011235 A | 1/1995 |
| JP | H07-11235 A | 1/1995 |
| JP | 2001-146540 A | 5/2001 |
| JP | 2003-192848 A | 7/2003 |
| WO | WO 2012/090941 * | 7/2012 |
| WO | 2013/175877 A1 | 11/2013 |
| WO | 2013/175878 A1 | 11/2013 |
| WO | 2014/024698 A1 | 2/2014 |
| WO | WO 2014/024698 * | 2/2014 |

OTHER PUBLICATIONS

Mar. 10, 2015 International Search Report issued in International Patent Application No. PCT/JP2014/081183.
May 31, 2016 International Preliminary Report on Patentability issued in PCT/JP2014/081183.
Nov. 7, 2016 Office Action issued in Chinese Patent Application No. 201480061482.X.
Magg. Werkstoff auf Basis von Hydriertem Nitrilkautschuk (HNBR): Polymerstruktur und Tieftemperatureigenschaft, Kautschuk Gummi Kunststoffe, pp. 596-603, 2006.
Jan. 10, 2018 Office Action issued in Russian Application No. 2016121713/05(033963).
Oct. 4, 2017 Supplementary European Search Report issued in European Application No. 14866001.2.

* cited by examiner

*Primary Examiner* — Deve E Valdez
(74) *Attorney, Agent, or Firm* — Oliff PLC

(57) ABSTRACT

A nitrile group-containing highly saturated copolymer rubber composition includes a nitrile group-containing highly saturated copolymer rubber (A) having α,β-ethylenically unsaturated nitrile monomer units and (meth)acrylic acid ester monomer units and having an iodine value of 120 or less and a polyether ester-based plasticizer (B) having structural unit made of three or more ether compounds which are successively bonded. A nitrile group-containing highly saturated copolymer rubber composition excellent in vulcanization speed and giving cross-linked rubber has excellent heat resistance and cold resistance.

15 Claims, No Drawings

NITRILE GROUP-CONTAINING HIGHLY SATURATED COPOLYMER RUBBER COMPOSITION AND CROSS-LINKED RUBBER

TECHNICAL FIELD

The present invention relates to a nitrile group-containing highly saturated copolymer rubber composition excellent in vulcanization speed and giving cross-linked rubber having excellent heat resistance and cold resistance and to cross-linked rubber obtained by cross-linking that composition.

BACKGROUND ART

In the past, as rubber excellent in oil resistance, heat resistance, and ozone resistance, a nitrile group-containing highly saturated copolymer rubber (also called "highly saturated nitrile rubber" and including hydrogenated nitrile rubber) has been known. In cross-linked form, it is being used as a material for belts, hoses, gaskets, packings, oil seals, and other various automobile-use rubber products. In recent years, automobile engines have been made increasingly smaller in size and higher in output. To deal with such a situation, further improvement in the heat resistance is being sought from the nitrile group-containing highly saturated copolymer rubber used for the same. Further, recently, the material has been increasingly used in cold areas such as Northern Europe and Russia. Much further improvement of the cold resistance has been sought.

As opposed to this, Patent Document 1 discloses a rubber composition improved in cold resistance comprised of a nitrile group-containing highly saturated copolymer rubber having contents of bonded monomer units in the copolymer chain of (1) unsaturated nitrile-based monomer units: 10 to 40 wt %, (2) unsaturated carboxylic acid ester-based monomer units: 1 to 40 wt %, (3) conjugated diene-based monomer units: 20 wt % or less, and (4) hydrogenated conjugated diene-based monomer units: balance, the total of the monomer units (1) and the monomer units (2) being 30 to 50 wt % and the total of the monomer units (3) and monomer units (4) being 50 to 70 wt %, and of compounding agents.

However, the cross-linked rubber obtained using the rubber composition disclosed in this Patent Document 1 is considerably improved in cold resistance, but is not sufficient in heat resistance. Much further improvement of the heat resistance and cold resistance has been desired.

PRIOR ART DOCUMENTS

Patent Documents

Patent Document 1: Japanese Patent Publication No. 63-95242A

DISCLOSURE OF THE INVENTION

Problem to be Solved by the Invention

The present invention was made in consideration of such an actual situation and has as its object to provide a nitrile group-containing highly saturated copolymer rubber composition excellent in vulcanization speed and giving cross-linked rubber having excellent heat resistance and cold resistance and to provide cross-linked rubber obtained by cross-linking that composition.

Means for Solving the Problems

The inventors engaged in intensive research to solve the above problem and as a result discovered that by using, as the nitrile group-containing highly saturated copolymer rubber, a rubber containing (meth)acrylic acid ester monomer units and combining this with a polyether ester-based plasticizer having structural unit comprised of three or more ether compounds which are successively bonded, the obtained rubber composition is excellent in vulcanization speed and can give cross-linked rubber excellent in heat resistance and cold resistance, and thereby completed the present invention.

That is, according to the present invention, there is provided a nitrile group-containing highly saturated copolymer rubber composition comprising a nitrile group-containing highly saturated copolymer rubber (A) having $\alpha,\beta$-ethylenically unsaturated nitrile monomer units and (meth)acrylic acid ester monomer units and having an iodine value of 120 or less and a polyether ester-based plasticizer (B) having structural unit comprised of three or more ether compounds which are successively bonded.

Preferably, the polyether ester-based plasticizer (B) has a molecular weight of 600 to 5000.

Preferably, the polyether ester-based plasticizer (B) is a compound expressed by the following general formula (1):

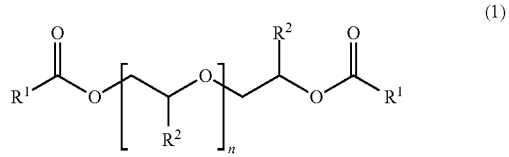

where, in the above general formula (1), $R^1$ indicates, respectively independently, a hydrogen atom or $C_1$ to $C_{350}$ hydrocarbon group, $R^2$ indicates, respectively independently, a hydrogen atom or $C_1$ to $C_{350}$ hydrocarbon group, and "n" indicates an integer of 3 to 100.

Preferably, the polyether ester-based plasticizer (B) has a viscosity of 15 to 200 mPa·s/25° C., a solidification point of 10 to −20° C., and an SP value of 7 to 11 $(cal/cm^3)^{1/2}$.

Preferably, a content of the polyether ester-based plasticizer (B) is 1 to 30 parts by weight with respect to 100 parts by weight of the highly saturated nitrile rubber (A).

Further, according to the present invention, there is provided a cross-linkable rubber composition obtained by blending a cross-linking agent into any of the above nitrile group-containing highly saturated copolymer rubber compositions.

Further, according to the present invention, there is provided cross-linked rubber obtained by cross-linking the above cross-linkable rubber composition.

Effects of the Invention

According to the present invention, there is provided a nitrile group-containing highly saturated copolymer rubber composition excellent in vulcanization speed and giving cross-linked rubber having excellent heat resistance and cold resistance and provided cross-linked rubber obtained by cross-linking the composition and having excellent heat resistance and cold resistance.

DESCRIPTION OF EMBODIMENTS

Nitrile Group-Containing Highly Saturated Copolymer Rubber Composition

The nitrile group-containing highly saturated copolymer rubber composition of the present invention is a composition containing a nitrile group-containing highly saturated copolymer rubber (A) having α,β-ethylenically unsaturated nitrile monomer units and (meth)acrylic acid ester monomer units and having an iodine value of 120 or less, and a polyether ester-based plasticizer (B) having structural unit comprised of three or more ether compounds which are successively bonded.

Nitrile Group-Containing Highly Saturated Copolymer Rubber (A)

The nitrile group-containing highly saturated copolymer rubber (A) used in the present invention (below, sometimes referred to as the "highly saturated nitrile rubber (A)") is rubber having α,β-ethylenically unsaturated nitrile monomer units and (meth)acrylic acid ester monomer units and having an iodine value of 120 or less.

The α,β-ethylenically unsaturated nitrile monomer forming the α,β-ethylenically unsaturated nitrile monomer units is not particularly limited so long as an α,β-ethylenically unsaturated compound having a nitrile group. For example, acrylonitrile; α-chloroacrylonitrile, α-bromoacrylonitrile, and other α-halogenoacrylonitriles; methacrylonitrile and other α-alkylacrylonitriles, etc. may be mentioned. The α,β-ethylenically unsaturated nitrile monomers may be used as single type alone or as a plurality of types together. Among these as well, acrylonitrile and methacrylonitrile are preferable.

The content of the α,β-ethylenically unsaturated nitrile monomer units is preferably 5 to 50 wt % with respect to the total monomer units forming the highly saturated nitrile rubber (A), more preferably 10 to 40 wt %, furthermore preferably 10 to 30 wt %. If the content of the α,β-ethylenically unsaturated nitrile monomer units is too small, the obtained cross-linked rubber is liable to fall in oil resistance, while conversely if too large, there is a possibility of the cold resistance falling.

The (meth)acrylic acid ester monomer forming the (meth)acrylic acid ester monomer units (meaning "acrylic acid ester monomer units and/or methacrylic acid ester monomer units", same below) is not particularly limited so long as an ester of a (meth)acrylic acid. For example, methyl acrylate, ethyl acrylate, n-butyl acrylate, n-dodecyl acrylate, methyl methacrylate, ethyl methacrylate, and other (meth)acrylic acid alkyl esters having $C_1$ to $C_{18}$ alkyl groups; methoxymethyl acrylate, methoxyethyl acrylate, methoxyethyl methacrylate, and other (meth)acrylic acid alkoxyalkyl esters having $C_2$ to $C_{12}$ alkoxyalkyl groups; α-cyanoethyl acrylate, α-cyanoethyl methacrylate, α-cyanobutyl methacrylate, and other (meth)acrylic acid cyanoalkyl esters having $C_2$ to $C_{12}$ cyanoalkyl groups; 2-hydroxyethyl acrylate, 2-hydroxypropyl acrylate, 2-hydroxyethyl methacrylate, and other (meth)acrylic acid hydroxyalkyl esters having $C_1$ to $C_{12}$ hydroxyalkyl groups; etc. may be mentioned. The (meth)acrylic acid ester monomers may be used as single type alone or as a plurality of types together. Among these as well, since the effect of improvement of the cold resistance of the obtained cross-linked rubber is large, (meth)acrylic acid alkyl esters having $C_1$ to $C_{18}$ alkyl groups are preferable, (meth)acrylic acid alkyl esters having $C_2$ to $C_8$ alkyl groups are more preferable, and n-butyl acrylate is particularly preferable.

The content of the (meth)acrylic acid ester monomer units is preferably 1 to 60 wt % with respect to the total monomer units forming the highly saturated nitrile rubber (A), more preferably 10 to 50 wt %, furthermore preferably 20 to 50 wt %. If the content of the (meth)acrylic acid ester monomer units is too small, the obtained cross-linked rubber is liable to fall in cold resistance, while conversely if too great, the obtained cross-linked rubber is liable to fall in oil resistance.

Further, the highly saturated nitrile rubber (A) used in the present invention preferably contain, in addition to the above α,β-ethylenically unsaturated nitrile monomer units and (meth)acrylic acid ester monomer units, diene monomer units and/or α-olefin monomer units. Due to this, the obtained cross-linked rubber can be improved in rubbery elasticity.

As specific examples of the diene monomer forming the diene monomer units, 1,3-butadiene, isoprene, 2,3-dimethyl-1,3-butadiene, 1,3-pentadiene, and other $C_4$ or more conjugated diene monomers; 1,4-pentadiene, 1,4-hexadiene, and other $C_5$ to $C_{12}$ non-conjugated diene monomers; etc. may be mentioned. Among these, a conjugated diene monomer is preferable, while 1,3-butadiene is more preferable.

As the α-olefin monomer forming the α-olefin monomer units, a $C_2$ to $C_{12}$ one is preferable, specifically, ethylene, propylene, 1-butene, 4-methyl-1-pentene, 1-hexene, 1-octene, etc. may be mentioned.

When the highly saturated nitrile rubber (A) is made to contain diene monomer units and/or α-olefin monomer units, the ratio of content of these is preferably 35 to 94 wt % with respect to the highly saturated nitrile rubber (A) as a whole, more preferably 40 to 80 wt %, furthermore preferably 40 to 70 wt %. If the content of the diene monomer units and/or α-olefin monomer units is too small, the obtained cross-linked rubber is liable to fall in rubbery elasticity, while conversely if too large, the heat resistance and chemical resistance stability may be impaired.

Further, the highly saturated nitrile rubber (A) used in the present invention can include units of another monomer able to copolymerize with the α,β-ethylenically unsaturated nitrile monomer, (meth)acrylic acid ester monomer, diene monomer, and/or α-olefin monomer. As such another monomer, an α,β-ethylenically unsaturated dicarboxylic acid monoester monomer, α,β-ethylenically unsaturated dicarboxylic acid diester monomer, α,β-ethylenically unsaturated monocarboxylic acid monomer, α,β-ethylenically unsaturated polyvalent carboxylic acid monomer, α,β-ethylenically unsaturated polyvalent carboxylic acid anhydride monomer, aromatic vinyl monomer, fluorine-containing vinyl monomer, copolymerizable antiaging agent, etc. may be illustrated.

As the α,β-ethylenically unsaturated dicarboxylic acid monoester monomer, for example, monomethyl maleate, monoethyl maleate, monopropyl maleate, mono-n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono-n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono-n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono-n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

As the α,β-ethylenically unsaturated dicarboxylic acid diester monomer, for example, dimethyl maleate, di-n-butyl maleate, and other maleic acid dialkyl esters; dimethyl fumarate, di-n-butyl fumarate, and other fumaric acid dialkyl esters; dicyclopentyl maleate, dicyclohexyl maleate, and other maleic acid dicycloalkyl esters; dicyclopentyl fumarate, dicyclohexyl fumarate, and other fumaric acid dicycloalkyl esters; dimethyl itaconate, di-n-butyl itaconate, and other itaconic acid dialkyl esters; dicyclohexyl itaconate and other itaconic acid dicycloalkyl esters; etc. may be mentioned.

As the α,β-ethylenically unsaturated monocarboxylic acid monomer, acrylic acid, methacrylic acid, crotonic acid, etc. may be mentioned.

As the α,β-ethylenically unsaturated polyvalent carboxylic acid monomer, itaconic acid, fumaric acid, maleic acid, etc. may be mentioned.

As the α,β-ethylenically unsaturated polyvalent carboxylic acid anhydride monomer, maleic anhydride etc. may be mentioned.

As the aromatic vinyl monomer, styrene, α-methylstyrene, vinylpyridine, etc. may be mentioned.

As the fluorine-containing vinyl monomer, fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl) cinnamamide, N-(4-anilinophenyl) crotonamide, N-phenyl-4-(3-vinylbenzyloxy) aniline, N-phenyl-4-(4-vinylbenzyloxy) aniline, etc. may be illustrated.

These copolymerizable other monomers may be used as a plurality of types together. The content of the other monomer units is preferably 50 wt % or less with respect to the total monomer units forming the highly saturated nitrile rubber (A), more preferably 40 wt % or less, furthermore preferably 10 wt % or less.

The highly saturated nitrile rubber (A) used in the present invention has an iodine value of 120 or less, preferably 80 or less, more preferably 25 or less, furthermore preferably 20 or less. If the highly saturated nitrile rubber (A) is too high in iodine value, the obtained cross-linked rubber is liable to fall in heat resistance and ozone resistance.

The highly saturated nitrile rubber (A) used in the present invention has a polymer Mooney viscosity ($ML_{1+4}$, 100° C.) of preferably 15 to 200, more preferably 20 to 150, furthermore preferably 30 to 120. If the highly saturated nitrile rubber (A) is too low in polymer Mooney viscosity, the obtained cross-linked rubber is liable to fall in mechanical properties, while conversely if too high, the nitrile group-containing highly saturated copolymer rubber composition may fall in workability.

Further, the method of production of the highly saturated nitrile rubber (A) used in the present invention is not particularly limited. For example, the method of copolymerization of an α,β-ethylenically unsaturated nitrile monomer, (meth)acrylic acid ester monomer, diene monomer, and/or α-olefin monomer and another monomer able to copolymerize with these added according to need is convenient and preferable. As the polymerization method, any of the known emulsion polymerization method, suspension polymerization method, bulk polymerization method, and solution polymerization method may be used, but due to the ease of control of the polymerization reaction, the emulsion polymerization method is preferable. Note that, when the copolymer obtained by the copolymerization has an iodine value higher than 120, the copolymer may also be hydrogenated (hydrogenation reaction). In this case, the method of hydrogenation is not particularly limited. A known method may be employed.

Polyether Ester-Based Plasticizer (B) Having Structural Unit Comprised of Three or More Ether Compounds which are Successively Bonded The polyether ester-based plasticizer (B) having structural unit comprised of three or more ether compounds which are successively bonded used in the present invention (below, sometimes referred to as the "polyether ester-based plasticizer (B)") is not particularly limited so long as a compound having structural unit comprised of three or more ether compounds which are successively bonded and having an ester structure. In the present invention, by blending the polyether ester-based plasticizer (B) into the above-mentioned nitrile group-containing highly saturated copolymer rubber (A), it is possible to make the nitrile group-containing highly saturated copolymer rubber composition excellent in vulcanization speed and, further, give a cross-linked rubber excellent in heat resistance and cold resistance.

The polyether ester-based plasticizer (B) used in the present invention may be any compound having structural unit comprised of three or more ether compounds which are successively bonded and having an ester structure, but a compound of a molecular weight of 600 to 5000 is preferable, a compound of a molecular weight of 600 to 2000 is more preferable, and a compound of a molecular weight of 600 to 1000 is particularly preferable. By using a compound with a molecular weight in the above range, the effect of addition of the polyether ester-based plasticizer (B), that is, the effect of improvement of the vulcanization speed, and the effect of improvement of the heat resistance and cold resistance can be made more remarkable.

Further, as the polyether ester-based plasticizer (B) used in the present invention, a compound expressed by the following general formula (1) may be suitably mentioned.

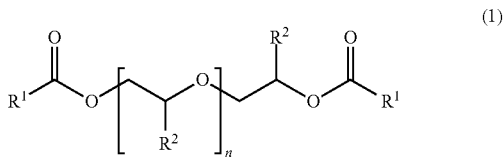

(1)

In the above general formula (1), $R^1$, respectively independently, is a hydrogen atom or $C_1$ to $C_{350}$ hydrocarbon group, preferably a hydrogen atom or $C_1$ to $C_{100}$ hydrocarbon group, particularly preferably a hydrogen atom or $C_1$ to $C_{60}$ hydrocarbon group. $R^2$, respectively independently, is a hydrogen atom or $C_1$ to $C_{350}$ hydrocarbon group, preferably a hydrogen atom or $C_1$ to $C_{100}$ hydrocarbon group, particularly preferably a hydrogen atom or $C_1$ to $C_{60}$ hydrocarbon group. Further, "n" is an integer of 3 to 100, preferably an integer of 3 to 50, particularly preferably an integer of 3 to 20.

Note that, the compound expressed by the above general formula (1) can be produced, for example, by obtaining a polymer of the corresponding alkylene oxide and reacting the end hydroxyl groups of the obtained polymer and the corresponding carboxylic acid for esterification.

Further, as the polyether ester-based plasticizer (B) used in the present invention, from the viewpoint of being able to raise the effect of addition more, a compound where the viscosity, solidification point, and SP value are within the following ranges is preferable. That is, the viscosity is preferably 15 to 200 mPa·s/25° C., more preferably 30 to 200 mPa·s/25° C., furthermore preferably 50 to 120 mPa·s/25° C. The solidification point is preferably 10 to −20° C., more preferably 0 to −20° C., furthermore preferably −2 to −15° C. Further, the SP value (solubility parameter) is preferably 7 to 11 $(cal/cm)^{1/2}$, more preferably 8 to 10 $(cal/cm)^{1/2}$.

In the nitrile group-containing highly saturated copolymer rubber composition of the present invention, the amount of the polyether ester-based plasticizer (B) is preferably 1 to 30 parts by weight with respect to 100 parts by weight of the highly saturated nitrile rubber (A), more preferably 2 to 20 parts by weight, furthermore preferably 5 to 15 parts by weight. If the amount of the polyether ester-based plasticizer (B) is too small, the effect of addition, that is, the effect of improvement of the vulcanization speed, and the effect of improvement of the cold resistance and heat resistance become difficult to obtain, while if too great, the tensile strength is liable to fall.

Cross-Linkable Rubber Composition

The cross-linkable rubber composition of the present invention is obtained by blending a cross-linking agent into the above-mentioned nitrile group-containing highly saturated copolymer rubber composition containing the highly saturated nitrile rubber (A) and polyether ester-based plasticizer (B). The cross-linking agent is not particularly limited, but a sulfur-based cross-linking agent or organic peroxide cross-linking agent may be mentioned. Among these as well, an organic peroxide cross-linking agent is preferable.

As the sulfur-based cross-linking agents, powdered sulfur, flower of sulfur, precipitated sulfur, colloidal sulfur, surface-treated sulfur, insoluble sulfur, and other sulfurs; sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, high molecular weight polysulfide, and other sulfur-containing compounds; tetramethyl thiuram disulfide, selenium dimethyl dithiocarbamate, 2-(4'-morpholinodithio)benzothiazole and other sulfur-donor compounds; etc. may be mentioned. These may be used as single type alone or as a plurality of types together.

As the organic peroxide cross-linking agent, dicumyl peroxide, cumen hydroperoxide, t-butylcumyl peroxide, p-mentane hydroperoxide, di-t-butyl peroxide, 1,3-bis (t-butylperoxyisopropyl)benzene, 1,4-bis(t-butylperoxyisopropyl)benzene, 1,1-di-t-butylperoxy-3,3-trimethylcyclohexane, 4,4-bis-(t-butylperoxy)-n-butylvalerate, 2,5-dimethyl-2,5-di-t-butylperoxyhexane, 2,5-dimethyl-2,5-di-t-butylperoxyhexine-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. Among these, 1,3-bis(t-butylperoxyisopropyl)benzene is preferable. These may be used as single type alone or as a plurality of types together.

In the cross-linkable rubber composition of the present invention, the content of the cross-linking agent is not particularly limited, but is preferably 1 to 20 parts by weight with respect to 100 parts by weight of the highly saturated nitrile rubber (A), more preferably 1 to 10 parts by weight, particularly preferably 1 to 5 parts by weight.

Other Compounding Agents Etc.

Further, the nitrile group-containing highly saturated copolymer rubber composition and cross-linkable rubber composition of the present invention may contain compounding agents which are used for general rubber in accordance with need such as a cross-linking retarder, antiaging agent, filler, reinforcing agent, slip agent, tackifier, lubricant, processing aid, flame retardant, antifungal agent, antistatic agent, coloring agent, or other additives. The amounts of these compounding agents are not particularly limited so long as a range not impairing the effect of the present invention. Amounts corresponding to the objective may be suitably mixed in.

As the antiaging agent, a phenol-based, amine-based, benzimidazole-based, phosphorus acid-based, or other antiaging agent can be used. As phenol-based ones, 2,2'-methylenebis(4-methyl-6-t-butylphenol) etc. may be mentioned, as amine-based ones, 4,4'-bis($\alpha,\alpha$-dimethylbenzyl)diphenylamine, N-isopropyl-N'-phenyl-p-phenylene diamine, etc. may be mentioned, as benzimidazole-based ones, 2-mercaptobenzimidazole, 2-mercaptobenzimidazole zinc salts, etc. may be mentioned. These may be used as single type alone or as a plurality of types together.

Further, as the filler, carbon black, silica, calcium carbonate, aluminum silicate, magnesium silicate, calcium silicate, magnesium oxide, staple fibers, and zinc (meth)acrylate, magnesium (meth)acrylate and other $\alpha,\beta$-ethylenically unsaturated carboxylic acid metal salts etc. may be mentioned.

Furthermore, the nitrile group-containing highly saturated copolymer rubber composition and cross-linkable rubber composition of the present invention may also contain a rubber other than the highly saturated nitrile rubber (A) in a range where the effects of the present invention are not impaired. The rubber other than the highly saturated nitrile rubber (A) is not particularly limited, but acrylic rubber, ethylene-acrylic acid copolymer rubber, fluororubber, styrene-butadiene copolymer rubber, ethylene-propylene copolymer rubber, ethylene-propylene-diene ternary copolymer rubber, natural rubber, and polyisoprene rubber, ethylene-vinyl acetate copolymer, etc. may be mentioned. Note that, the amount in the case of blending a rubber other than the highly saturated nitrile rubber is preferably 100 parts by weight or less with respect to 100 parts by weight of the highly saturated nitrile rubber (A), more preferably 50 parts by weight or less, particularly preferably 30 parts by weight or less.

The nitrile group-containing highly saturated copolymer rubber composition and cross-linkable rubber composition of the present invention are prepared by mixing the above ingredients in a preferably non-aqueous system. The method of preparing the nitrile group-containing highly saturated copolymer rubber composition and cross-linkable rubber composition of the present invention is not particularly limited, but the composition is usually prepared by kneading the ingredients other than the cross-linking agent and ingredients unstable against heat (for example, cross-linking aid etc.) by a Banbury mixer, internal mixer, kneader, or other mixer by primary kneading, then transferring the mixture to rolls etc., adding the cross-linking agent and ingredients unstable against heat, and kneading them by secondary kneading.

Cross-Linked Rubber

The cross-linked rubber of the present invention is obtained by cross-linking the above-mentioned cross-linkable rubber composition.

The cross-linked rubber of the present invention can be produced by using the cross-linkable rubber composition of the present invention and, for example, shaping it by a shaping machine corresponding to the desired shape such as an extruder, injection molding machine, press, rolls, etc. and heating it for a cross-linking reaction to fix the shape as a cross-linked product. In this case, it can be cross-linked after shaping it in advance or can be cross-linked simultaneous with shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on the shape, size, etc. of the cross-linked rubber, sometimes, even if the surface is cross-linked, the inside part is not sufficiently cross-linked, so it is possible to further heat the rubber for secondary cross-linking.

As the heating method, press heating, steam heating, oven heating, hot air heating, or other general methods which are used for cross-linking rubber may be suitably selected.

The thus obtained cross-linked rubber of the present invention is obtained using the cross-linkable rubber composition obtained by blending the cross-linking agent into the nitrile group-containing highly saturated copolymer rubber composition of the present invention, so is excellent in heat resistance and cold resistance.

For this reason, the cross-linked rubber of the present invention can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, conveyor belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics and pharmaceuticals, fields which come into contact with food, the electronics field, and other broad ranged applications.

EXAMPLES

Below, examples and comparative examples will be given to specifically explain the present invention, but the present invention is not limited to these examples. Note that, below, unless otherwise indicated, "parts" are based on weight. Further, the tests and evaluations were based on the following.

The ratios of contents of the monomer units forming the highly saturated nitrile rubber were measured by the following method.

That is, the ratio of content of the 1,3-butadiene units (including saturated parts) was calculated by measuring the iodine values before the hydrogenation reaction and after the hydrogenation reaction using highly saturated nitrile rubber (according to JIS K6235).

The ratio of content of the acrylonitrile units was calculated by measuring the nitrogen content in the highly saturated nitrile rubber by the Kjeldahl method in accordance with JIS K6384.

The ratio of content of the n-butyl acrylate units was calculated as the remaining ingredients after the above monomer units.

Iodine Value

The iodine value of the highly saturated nitrile rubber was measured in accordance with JIS K6235.

Mooney Viscosity (Polymer Mooney)

The Mooney viscosity of the highly saturated nitrile rubber (Polymer Mooney) was measured in accordance with JIS K6300-1 (units: ($ML_{1+4}$, 100° C.]).

Cross-Linkability Test

The cross-linkable rubber composition was tested for cross-linkability using a cross-linking tester (Oscillating Disk Rheometer ODR, made by Toyo Seiki) at 170° C. for 30 minutes. Further, from the results of the cross-linkability test, the minimum torque "NM" (units: dN·m), maximum torque "MH" (units: dN·m), and $T_{90}$ (units: min) were measured. Note that $T_{90}$ means the time required for the torque to rise from the minimum torque ML by 90% when indexed to the "maximum torque MH minus minimum torque ML" as 100%. Note that, the smaller the $T_{90}$, the faster the vulcanization speed and the better the productivity can be judged to be.

Normal Physical Properties (Tensile Strength, Elongation, and 100% Tensile Stress)

The cross-linkable rubber composition was placed in a vertical 15 cm, horizontal 15 cm, depth 0.2 cm mold and pressed by a press pressure of 10 MPa while press-forming it at 170° C. for 20 minutes to obtain sheet-shaped cross-linked rubber. The obtained sheet-shaped cross-linked rubber was punched by a No. 3 type dumbbell to prepare test pieces. Further, the obtained test pieces were measured in accordance with JIS K6251 for tensile strength, elongation, and 100% tensile stress of the cross-linked rubber.

Heat Resistant Aging Test

The same procedure was followed as in the evaluation of the above normal physical properties to obtain sheet-shaped cross-linked rubber, then JIS K6257 was followed for an air heating aging test. Specifically, the obtained sheet-shaped cross-linked rubber was held under conditions of a temperature of 150° C. for 336 hours in a gear oven, then the same procedure was followed as with the above normal physical properties for a tensile test to measure the rate of change of elongation. The smaller the absolute value of the rate of change of elongation, the better the heat resistance can be judged to be.

Gehman's Torsion Test

The same procedure was followed as in the evaluation of the above normal physical properties to obtain sheet-shaped cross-linked rubber, then the obtained sheet-shaped cross-linked rubber was subjected to a Gehman's torsion test based on JIS K6261 (2006). The temperature T10 at which the specific modulus with respect to the modulus at room temperature (23° C.) became 10 times was measured. The lower the value of T10, the better the cold resistance can be judged to be.

Synthesis Example 1 (Synthesis of Highly Saturated Nitrile Rubber (A-1))

In a reactor, to 200 parts of ion exchanged water, 0.2 part of sodium carbonate was dissolved. To this, 2.25 parts of fatty acid potassium soap (potassium salt of fatty acid) were added to prepare a soap water solution. Further, to this soap water solution, 9 parts of acrylonitrile, 15 parts of n-butyl acrylate, and 0.45 part of t-dodecyl mercaptan (molecular weight adjuster) were successively charged, the inside gas was replaced with nitrogen three times, then 35 parts of 1,3-butadiene were charged. Next, the inside of the reactor was held at 5° C., and 0.1 part of cumen hydroperoxide (polymerization initiator) and suitable quantities of a reducing agent and chelating agent were charged to start the polymerization reaction. When the polymerization conversion rate became 60%, 10 parts of acrylonitrile, 10 parts of n-butyl acrylate, and 21 parts of 1,3-butadiene were added. At the time the polymerization conversion rate became 85%, 0.1 part of concentration 10% hydroquinone (polymerization terminator) aqueous solution was added to stop the polymerization reaction and a water temperature 60° C. rotary evaporator was used to remove the residual monomer to obtain a latex of nitrile rubber (solid content concentration about 25 wt %).

Next, the above obtained latex was added to an aqueous solution of aluminum sulfate in an amount giving a 3 wt % ratio with respect to the amount of the nitrile rubber, then stirred to solidify the latex and washed with water while separating it by filtration, then dried in vacuo at 60° C. for 12 hours to obtain the nitrile rubber (a-1).

Further, the obtained nitrile rubber (a-1) was dissolved in acetone to give a concentration 12%. This was placed in an autoclave, a palladium-silica catalyst was added to the nitrile rubber (a-1) in 400 wt ppm, then a hydrogenation reaction was performed at a hydrogen pressure of 3.0 MPa. After the end of the hydrogenation reaction, the rubber was poured into a large amount of water to cause it to solidify and was separated by filtration and dried to obtain the highly saturated nitrile rubber (A-1). The obtained highly saturated nitrile rubber (A-1) had a composition of 19 wt % of acrylonitrile units, 35.5 wt % of n-butyl acrylate units, and 45.5 wt % of butadiene units (including saturated parts), had an iodine value of 16, and had a polymer Mooney viscosity ($ML_{1+4}$, 100° C.) of 65.

Synthesis Example 2 (Synthesis of Highly Saturated Nitrile Rubber (A-2))

The nitrile rubber (a-1) obtained in Synthesis Example 1 was dissolved in acetone to give a concentration of 12%. This was placed in an autoclave, a palladium-silica catalyst was added to the nitrile rubber (a-1) in 500 wt ppm, then a hydrogenation reaction was performed at a hydrogen pressure of 3.0 MPa. After the end of the hydrogenation reaction, the rubber was poured into a large amount of water to cause it to solidify and was separated by filtration and dried to obtain the highly saturated nitrile rubber (A-2). The obtained highly saturated nitrile rubber (A-2) had a composition of 19 wt % of acrylonitrile units, 35.5 wt % of n-butyl acrylate units, and 45.5 wt % of butadiene units (including saturated parts), had an iodine value of 10, and had a polymer Mooney viscosity ($ML_{1+4}$, 100° C.) of 70.

Synthesis Example 3 (Synthesis of Highly Saturated Nitrile Rubber (A'-3))

In a reactor, to 200 parts of ion exchanged water, 0.2 part of sodium carbonate was dissolved. To this, 2.25 parts of fatty acid potassium soap (potassium salt of fatty acid) were added to prepare a soap water solution. Further, to this soap water solution, 38 parts of acrylonitrile and 0.45 part of t-dodecyl mercaptan (molecular weight adjuster) were successively charged, the inside gas was replaced with nitrogen three times, then 62 parts of 1,3-butadiene were charged. Next, the inside of the reactor was held at 5° C., and 0.1 part of cumen hydroperoxide (polymerization initiator) and suitable quantities of a reducing agent and chelating agent were charged to start the polymerization reaction. At the time the polymerization conversion rate became 85%, 0.1 part of concentration 10% hydroquinone (polymerization terminator) aqueous solution was added to stop the polymerization reaction and a water temperature 60° C. rotary evaporator was used to remove the residual monomer to obtain a latex of nitrile rubber (solid content concentration about 25 wt %).

Next, the above obtained latex was added to an aqueous solution of aluminum sulfate in an amount giving a 3 wt % ratio with respect to the amount of the nitrile rubber, then stirred to solidify the latex and washed with water while separating it by filtration, then dried in vacuo at 60° C. for 12 hours to obtain the nitrile rubber (a-2).

Further, the obtained nitrile rubber (a-2) was dissolved in acetone to give a concentration 12%. This was placed in an autoclave, a palladium-silica catalyst was added to the nitrile rubber in 500 wt ppm, then a hydrogenation reaction was performed at a hydrogen pressure of 3.0 MPa. After the end of the hydrogenation reaction, the rubber was poured into a large amount of water to cause it to solidify and was separated by filtration and dried to obtain the highly saturated nitrile rubber (A'-3). The obtained highly saturated nitrile rubber (A'-3) had a composition of 36 wt % of acrylonitrile units and 64 wt % of butadiene units (including saturated parts), had an iodine value of 10, and had a polymer Mooney viscosity ($ML_{1+4}$, 100° C.) of 81.

Example 1

Using a Bambury mixer, to 100 parts of the highly saturated nitrile rubber (A-1) obtained in Synthesis Example 1, 80 parts of FEF carbon (product name: "Seast SO", made by Tokai Carbon, carbon black), 10 parts of polyether ester-based plasticizer (product name: "ADK Cizer RS-735", made by Adeka, molecular weight: 850, viscosity: 80 mPa·s/25° C., solidification point: −8° C., SP value: 9.2 (cal/cm$^3$)$^{1/2}$, compound expressed by the above general formula (1)), 1 part of 4,4'-bis(α,α-dimethylbenzyl)diphenylamine (product name: "Nauguard 445", made by Crompton Corporation, antiaging agent), 1 part of zinc salt of 2-mercaptobenzimidazole (product name: "Nocrac MBZ", made by Ouchi Shinko Chemical Industrial, antiaging agent), and 6 parts of 1,3-bis(t-butylperoxyisopropyl)benzene 40% product (product name: "Vul Cup 40KE", made by Arkema, organic peroxide cross-linking agent) were added and kneaded to obtain a cross-linkable rubber composition.

Further, the obtained cross-linkable rubber composition was used by the above-mentioned method to perform a cross-linkability test, evaluate the normal physical properties, perform a heat resistant aging test, and perform a Gehman's torsion test. The results are shown in Table 1.

Example 2

Except for using, instead of 100 parts of the highly saturated nitrile rubber (A-1), 100 parts of the highly saturated nitrile rubber (A-2) obtained in Synthesis Example 2, the same procedure was followed as in Example 1 to prepare a cross-linkable rubber composition and the same procedure was followed to evaluate it. The results are shown in Table 1.

Example 3

Except for changing the amount of the FEF carbon (product name: "Seast SO", made by Tokai Carbon, carbon black) from 80 parts to 50 parts and further mixing in 15 parts of zinc methacrylate, the same procedure was followed as in Example 1 to prepare a cross-linkable rubber composition and the same procedure was followed to evaluate it. The results are shown in Table 1.

Comparative Example 1

Except for using, instead of 10 parts of the polyether ester-based plasticizer, 10 parts of adipic acid ether ester-based plasticizer (product name: "ADK Cizer RS-107", made by Adeka, molecular weight: 434, viscosity: 20 mPa·s/25° C., solidification point: −47° C., SP value: 9.2 (cal/cm$^3$)$^{1/2}$), the same procedure was followed as in Example 1 to prepare a cross-linkable rubber composition and the same procedure was followed to evaluate it. The results are shown in Table 1.

Comparative Example 2

Except for using, instead of 10 parts of the polyether ester-based plasticizer, 10 parts of tri-2-ethylhexyl trimellitate (plasticizer, product name: "ADK Cizer C-8", made by Adeka, molecular weight: 547, viscosity: 220 mPa·s/25° C., solidification point: −30° C., SP value: 8.9 (cal/cm$^3$)$^{1/2}$), the same procedure was followed as in Example 1 to prepare a cross-linkable rubber composition and the same procedure was followed to evaluate it. The results are shown in Table 1.

Comparative Example 3

Except for not using 10 parts of the polyether ester-based plasticizer, the same procedure was followed as in Example 1 to prepare a cross-linkable rubber composition and the same procedure was followed to evaluate it. The results are shown in Table 1.

Comparative Example 4

Except for using, instead of 100 parts of the highly saturated nitrile rubber (A-1), 100 parts of the highly saturated nitrile rubber (A'-3) obtained in Synthesis Example 3, the same procedure was followed as in Example 1 to prepare a cross-linkable rubber composition and the same procedure was followed to evaluate it. The results are shown in Table 1.

TABLE 1

| | | | Examples | | | Comparative Examples | | | |
|---|---|---|---|---|---|---|---|---|---|
| | | | 1 | 2 | 3 | 1 | 2 | 3 | 4 |
| Highly saturated nitrile rubber | | | | | | | | | |
| Composition | Type | | (A-1) | (A-2) | (A-1) | (A-1) | (A-1) | (A-1) | (A'-3) |
| | Acrylonitrile units | (wt %) | 19 | 19 | 19 | 19 | 19 | 19 | 36 |
| | Butadiene units | (wt %) | 45.5 | 45.5 | 45.5 | 45.5 | 45.5 | 45.5 | 64 |
| | n-butyl acrylate units | (wt %) | 35.5 | 35.5 | 35.5 | 35.5 | 35.5 | 35.5 | — |
| | Iodine value | | 16 | 10 | 16 | 16 | 16 | 16 | 10 |
| | Polymer Mooney viscosity (ML$_{1+4}$, 100° C.) | | 65 | 70 | 65 | 65 | 65 | 65 | 81 |
| Composition of cross-linkable rubber composition | | | | | | | | | |
| Highly saturated nitrile rubber (A-1) | | (parts) | 100 | | 100 | 100 | 100 | 100 | |
| Highly saturated nitrile rubber (A-2) | | (parts) | | 100 | | | | | |
| Highly saturated nitrile rubber (A'-3) | | (parts) | | | | | | | 100 |
| FEF carbon black | | (parts) | 80 | 80 | 50 | 80 | 80 | 80 | 70 |
| Zinc methacrylate | | (parts) | | | 15 | | | | |
| Polyether ester-based plasticizer | | (parts) | 10 | 10 | 10 | | | | 10 |
| Adipic acid ether ester-based plasticizer | | (parts) | | | | 10 | | | |
| Tri-2-ethylhexyl trimellitate (plasticizer) | | (parts) | | | | | 10 | | |
| 4,4'-bis(α,α-dimethylbenzyl)diphenylamine | | (parts) | 1 | 1 | 1 | 1 | 1 | 1 | 1 |
| 2-mercaptobenzimidazole zinc salt | | (parts) | 1 | 1 | 1 | 1 | 1 | 1 | 1 |
| 1,3-bis(t-butylperoxyisopropyl)benzene (40% product) | | (parts) | 6 | 6 | 6 | 6 | 6 | 6 | 6 |

TABLE 1-continued

| | | Examples | | | Comparative Examples | | | |
|---|---|---|---|---|---|---|---|---|
| | | 1 | 2 | 3 | 1 | 2 | 3 | 4 |
| Vulcanization speed | | | | | | | | |
| T90 | (min) | 15.7 | 15.3 | 15.5 | 16 | 17.2 | 16.7 | 16.2 |
| Normal physical properties | | | | | | | | |
| Tensile strength | (MPa) | 20.1 | 21.1 | 24.5 | 18.3 | 20.1 | 21.9 | 27.2 |
| Elongation | (%) | 230 | 250 | 340 | 220 | 200 | 160 | 300 |
| 100% tensile stress | (MPa) | 7.9 | 7.6 | 8.1 | 8.0 | 9.9 | 14.9 | 7.8 |
| Heat aging test (heat resistance) | | | | | | | | |
| Rate of change of elongation | (%) | −30 | −25 | −29 | −45 | −40 | −38 | −39 |
| Gehman's torsion test (cold resistance) | | | | | | | | |
| T10 | (° C.) | −42 | −42 | −42 | −45 | −40 | −37 | −29 |

Note that, in Table 1, the weight ratio of the "butadiene units" includes saturated ones.

As shown in Table 1, the rubber composition containing the predetermined highly saturated nitrile rubber (A) and polyether ester-based plasticizer (B) of the present invention was fast in vulcanization speed, while the cross-linked rubber obtained using that rubber composition was excellent in heat resistance and cold resistance (Examples 1 to 3).

On the other hand, when using a plasticizer other than the polyether ester-based plasticizer (B) or when not mixing in the polyether ester-based plasticizer (B), the obtained cross-linked rubber was inferior in heat resistance (Comparative Examples 1 to 3).

Furthermore, when using as the highly saturated nitrile rubber an acrylonitrile-butadiene copolymer rubber not containing (meth)acrylic acid ester monomer units, the obtained cross-linked rubber was inferior in heat resistance and cold resistance (Comparative Example 4).

The invention claimed is:

1. A cross-linkable rubber composition comprising:
   a nitrile group-containing highly saturated copolymer rubber (A) consisting of (i) α,β-ethylenically unsaturated nitrile monomer units, (ii) at least one of diene monomer units and α-olefin monomer units, and (iii) (meth)acrylic acid ester monomer units, and having an iodine value of 120 or less,
   a plasticizer consisting of a polyether ester-based plasticizer (B) having structural unit comprised of three or more ether compounds which are successively bonded, and
   an organic peroxide cross-linking agent,
   wherein the polyether ester-based plasticizer (B) has a molecular weight of 850 to 5,000, a viscosity of 15 to 200 mPas/25° C., a solidification point of 10 to −20° C., and an SP value of 7 to 11 $(\text{cal/cm}^3)^{1/2}$.

2. The cross-linkable rubber composition according to claim 1 wherein the polyether ester-based plasticizer (B) has a molecular weight of 600 to 5000.

3. The cross-linkable rubber composition according to claim 1 wherein the polyether ester-based plasticizer (B) is a compound expressed by the following general formula (1):

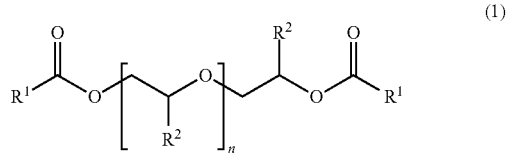

where, in the above general formula (1), $R^1$ indicates, respectively independently, a hydrogen atom or $C_1$ to $C_{350}$ hydrocarbon group, $R^2$ indicates, respectively independently, a hydrogen atom or $C_1$ to $C_{350}$ hydrocarbon group, and "n" indicates an integer of 3 to 100.

4. The cross-linkable rubber composition according to claim 1 wherein a content of the polyether ester-based plasticizer (B) is 1 to 30 parts by weight with respect to 100 parts by weight of the highly saturated nitrile rubber (A).

5. A cross-linked rubber obtained by cross-linking the cross-linkable rubber composition according to claim 1.

6. The cross-linkable rubber composition according to claim 1, wherein the organic peroxide cross-linking agent is at least one selected from the group consisting of dicumyl peroxide, cumen hydroperoxide, t-butylcumyl peroxide, p-mentane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butylperoxy)-n-butylvalerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, and t-butylperoxy benzoate.

7. The cross-linkable rubber composition according to claim 1, wherein the organic peroxide cross-linking agent is 1,3-bis(t-butylperoxyisopropyl)benzene.

8. The cross-linkable rubber composition according to claim 1, further comprising a carbon black.

9. The cross-linkable rubber composition according to claim 6, further comprising a carbon black.

10. The cross-linkable rubber composition according to claim 7, further comprising carbon black.

11. The cross-linkable rubber composition according to claim 1, further comprising an α,β-ethylenically unsaturated carboxylic acid metal salt.

12. The cross-linkable rubber composition according to claim 6, further comprising an α,β-ethylenically unsaturated carboxylic acid metal salt.

13. The cross-linkable rubber composition according to claim 7, further comprising an α,β-ethylenically unsaturated carboxylic acid metal salt.

14. The cross-linkable rubber composition according to claim 8, further comprising an α,β-ethylenically unsaturated carboxylic acid metal salt.

15. The cross-linkable rubber composition according to claim 10, further comprising an α,β-ethylenically unsaturated carboxylic acid metal salt.

\* \* \* \* \*